Oct. 19, 1971     KAZUYUKI ARAKAWA     3,613,470

GEAR TRANSMISSION MECHANISM OF A WEAVING LOOM

Filed Aug. 22, 1969

United States Patent Office 3,613,470
Patented Oct. 19, 1971

3,613,470
GEAR TRANSMISSION MECHANISM OF A WEAVING LOOM
Kazuyuki Arakawa, Kanazawa-shi, Japan, assignor to Tsudakoma Industrial Co., Ltd., Kanazawa-shi, Ishikawa-ken, Japan
Filed Aug. 22, 1969, Ser. No. 852,335
Claims priority, application Japan, Sept. 7, 1968, 43/77,339
Int. Cl. F16h 35/02
U.S. Cl. 74—393
2 Claims

ABSTRACT OF THE DISCLOSURE

In a transmission of rotation from a driving shaft of constant rotation to a driven shaft on a weaving loom using a gear train, time-functional rotation speed change of the latter within one rotation cycle of the former is attained by insertion into the gear train of a combination of gears of elliptical pitch circles, a combination of gears eccentrically mounted on the shafts, or a combination of elliptically profiled gears with eccentrically mounted gears.

---

Figure 1:
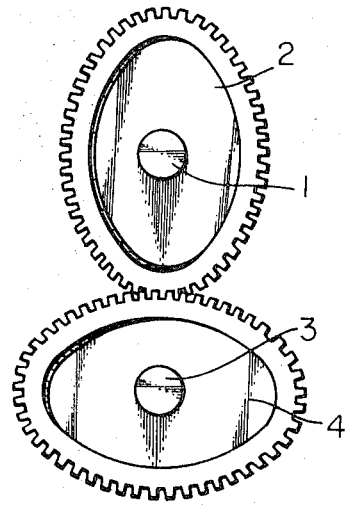

The present invention relates to an improvement in a gear transmission mechanism of a weaving loom, and more particularly it relates to improvements in a combination of gears for transmitting rotation from a driving shaft to a driven shaft of a weaving loom in such a manner that the rotating speed of the latter changes, as is desirably preset, in one rotational cycle while maintaining the rotational speed of the former in a constant condition.

In the conventional types of weaving looms, rotation of the crank shaft, that is, the driving shaft in this case, is transmitted to the tappet shaft, that is, the driven shaft in this case, at a transmission ratio of 2:1 by a combination of the crank wheel and the tappet shaft wheel. Picking motion of the loom is effected once in one rotational cycle of the crank shaft by rotation of the picking cams mounted to the tappet shaft.

With the recent trend of considerably increased weaving widths of fabrics, there arises a requirement for increasing the advancing speed of the shuttle which reciprocates along the lathe of the loom. This means that the profile of the picking cam must be provided with a steep curve for effecting instantaneous and quick acceleration of the shuttle at the time of the picking motion. Such an instantaneous acceleration of the shuttle inevitably entails the application of impact loading to the loom construction which causes frequent damage of the mechanical elements of the loom and the accidental failure in picking motion due mostly to such damage in machine elements, and which causes a degradation of the product quality due to such operational faults in weaving.

For a stable advancement of the shuttle during the picking motion, it is desirable, if possible, to slow down the swinging motion of the lathe sword in one cycle of the crank shaft rotation during the period corresponding to the shuttle advancement from one shuttle box to another along the lathe. By doing so, even when an increase in the advancing speed of the shuttle is required, it is feasible to mitigate the intensity of such a requirement.

A principal object of the present invention is to provide an improvement in a gear transmission mechanism of a weaving loom capable of changing a rotational speed of the shaft which effects picking motion as is desirably preset, in one rotational cycle of a crank shaft.

Another object of the present invention is to provide an improvement in a weaving loom gear transmission mechanism capable of changing a rotational speed of the lathe-sword swing-motion effecting shaft as is desirably preset, in one rotational cycle of a driving shaft.

Still another object of the present invention is to provide an improved weaving loom gear transmission mechanism capable of increasing shuttle speed without having to provide the profile of a picking cam with a steep curve.

A further object of the present invention is to provide an improved weaving loom gear transmission mechanism capable of mitigating the application of impact loading to the loom elements and avoiding operational faults caused thereby during the weaving process.

A still further object of the present invention is to provide an improved weaving loom gear transmission mechanism where damage to the loom elements can be reduced considerably, so that maintenance costs can be lowered to a great extent.

A still further object of the present invention is to provide an improved gear transmission mechanism which contributes considerably towards enhancement of the quality of products made on the loom.

In a rotation transmission from a driving shaft of a constant rotation speed to a driven shaft using a pair of gears mounted to respective shafts, rotational speed of the driven shaft can be changed successively if the length of arc of the pitch circle of the driving shaft gear corresponding to a definite rotation center angle changes successively. Such change in the arc length can be brought about by inserting one or more gears of elliptical circle pitch or eccentrically mounted to the shaft in the gear transmission mechanism.

In view of this principal conception, the improvement of the present invention is characterized by inserting a combination of gears of elliptical pitch circle, a combination of gears eccentrically mounted on the shafts, or a combination of a gear of elliptical pitch circle with a gear eccentrically mounted on the shaft in a weaving loom gear transmission mechanism. By this insertion, a constant rotation of a driving shaft, for example the crank shaft, can cause a time-functional change in a rotation of a driven shaft, for example the tappet shaft, within one rotational cycle of the driving shaft.

Figure 2:
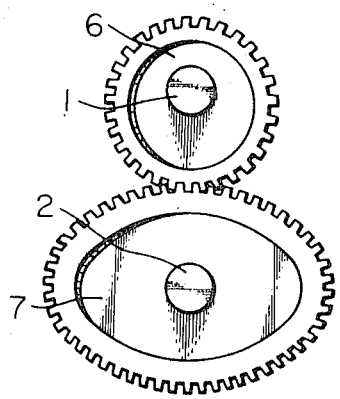
Figure 3:
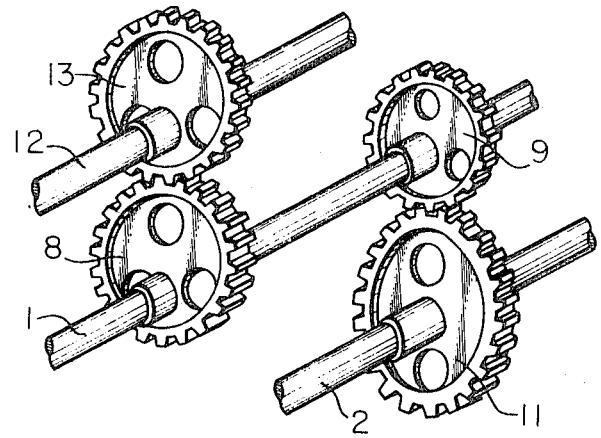

Further features and advantages of the present invention will be more apparently understood from the ensuing description, reference being made to the accompanying drawings in which;

FIG. 1 is a side view of an embodiment of the gear transmission mechanism of the present invention, FIG. 2 is a side view of another embodiment of the gear transmission mechanism of the present invention, FIG. 3 is a partly omitted perspective view of still another embodiment of the gear transmission mechanism of the present invention.

Referring to FIG. 1, an embodiment of the gear transmission mechanism of the present invention is shown. In the embodiment, a crank gear 2 having an elliptical pitch circle is mounted on a crank shaft 1 of a weaving loom in an arrangement meshing with a tappet shaft gear 4 of similar pitch circle and mounted on a tappet shaft 3. The angular phase relation between both gears 2 and 4 should be so designed that the longest diameter of the pitch circle of the crank gear 2 meets the shortest diameter of the pitch circle of the tappet shaft gear 4 at the moment of picking motion.

When the crank shaft 1 rotates at a definite rotational speed, the rotation of the tappet shaft 3 changes timefunctionally as already described within one cycle of the crank shaft rotation. Because, both gears 2 and 4 are so designed that one rotation of one gear corresponds to one rotation of the other gear, the rotational speed of the tappet shaft 3 changes periodically and in an identical form at every one rotation of the crank shaft 1 and comes to its utmost extent twice in every cycle. One of the two chances of utmost rotation is utilized for picking motion. At the moment of picking motion, the effective diameter of the pitch circle of the crank gear 2 becomes largest and that of the tappet shaft gear 4 becomes smallest. So, the transmission ratio from the crank shaft to the tappet shaft becomes largest, the tappet shaft is rotated at its utmost rotational speed and this brings about an effect which is the same that given by the provision of a steep curve to the picking cam profile, thus resulting in considerable acceleration of the shuttle advancement.

Another ombodiment of the gear transmission mechanism of the present invention is shown in FIG. 2, wherein a crank gear 6 is eccentrically mounted on the crank shaft 1 in an arrangement meshing with a tappet shaft gear 7 of elliptical pitch circle and mounted on the tappet shaft 2. The angular phase relation between both gears 6 and 7 should be so designed that the longest diametral direction of the eccentrically mounted gear 6 meets the shortest diameter of the ellipitically profiled gear 7 at the moment of picking motion. In this embodiment, the peripheral length of the pitch circle of the eccentrically mounted gear 6 corresponds to half of that of the elliptically profiled gear 7. So, one rotational cycle of the crank shaft 1 causes half periodical rotation of the tappet shaft and, once in one rotational cycle of the crank shaft 1, the rotational speed of the tappet shaft 2 attains a maximum.

As is already described, stable picking motion can be attained also by momentary slow-down of the rotation of the crank shaft 1 only during the shuttle advancement along the lathe from one box to an opposite box. An embodiment for attaining this purpose is shown in FIG. 3. In this embodiment, a driving gear 13 is eccentrically mounted on a main driving shaft 12 in an arrangement meshing with a driven gear 8 also eccentrically mounted on the crank shaft 1. Both gears 12 and 13 are provided with similar circle pitch profiles of a same peripheral length. The angular phase relationship between the gears 12 and 13 should be so designed that the shortest diametral direction of the driving gear 13 comes in the vicinity of the largest diametral direction of the driven gear 12 during the period wherein the shuttle advances from one box to an opposite box along the lathe on the weaving loom.

Aside from this arrangement, a crank gear 9 is eccentrically mounted on the crank shaft 1 in an arrangement meshing with a tappet shaft gear 11 also eccentrically mounted on the tappet shaft 2. The peripheral length of the pitch circle of the former corresponds to half of that of the latter. The angular phase relationship between the two gears 9 and 11 is so designed that the longest diametral direction of the crank gear 9 meets the shortest pitch circle diameter of the tappet shaft gear 11 at the moment of picking motion.

By employing the above-described combined gear transmission mechanism, picking motion can be carried out at a moment wherein the rotation of the crank shaft is at its lowest extent and the rotation of the tappet shaft is at its utmost extent. That is, the shuttle can be advanced at its most accelerated speed while the lathe swords are swinging at their slowest swinging speed. Any disturbance to the straight, stable and quick advancement of the shuttle can be mitgiated considerably, resulting in complete elimination of operational troubles during the weaving operation.

What is claimed is:

1. In a weaving loom having an improved gear transmission mechanism and including a shuttle, and means for periodically effecting the picking motion of the shuttle, the improvement wherein said gear transmission mechanism comprises a crank shaft rotationally mounted on the loom, a circular gear eccentrically mounted on said crank shaft, a tappet shaft rotationally mounted on the loom, and an elliptical gear mounted on said tappet shaft and in mesh with said circular gear, said elliptical gear having a peripheral length which is twice that of said circular gear, and said circular and elliptical gears having an angular phase relationship wherein the peripheral point of longest radial dimension of said circular gear engages a peripheral point of the minor diameter of said elliptical gear during the picking motion of the shuttle.

2. In a weaving loom having an improved gear transmission mechanism and including a shuttle, means for advancing the shuttle, and means for effecting a picking motion of the shuttle, the improvement wherein said gear transmission mechanism comprises a main drive shaft rotationally mounted on the loom, a first circular gear eccentrically mounted on said drive shaft, a crank shaft rotationally mounted on the loom, a second circular gear eccentrically mounted on said crank shaft and in mesh with said first gear, said first and second gears having equal diameters and having an angular phase relationship wherein the peripheral point of shortest radial dimension of said first gear engages the peripheral point of longest radial dimension of said second gear when the shuttle is advanced, a third circular gear eccentrically mounted on said crank shaft, a tappet shaft rotationally mounted on the loom, and an elliptical gear mounted on said tappet shaft and in mesh with said third gear, said elliptical gear having a peripheral length which is twice that of said third gear, and said third and elliptical gears having an angular phase relationship wherein the peripheral point of longest radial dimension of said third gear engages a peripheral point of the minor diameter of said elliptical gear during the picking motion of the shuttle.

References Cited

UNITED STATES PATENTS

| | | | |
|---|---|---|---|
| 2,585,971 | 2/1952 | Sloane | 74—393 |
| 2,957,363 | 10/1960 | Ingham et al. | 74—437 |
| 3,061,180 | 10/1962 | Durgin | 74—393 UX |
| 3,125,892 | 3/1964 | Schwesinger | 74—393 |
| 3,178,959 | 4/1965 | Schwesinger | 74—437 |
| 3,327,637 | 6/1967 | Hotta | 74—393 X |
| 3,364,667 | 1/1968 | Cunningham | 74—393 X |
| 3,393,593 | 7/1968 | Eyberger | 74—393 X |

LEONARD HALL GERIN, Primary Examiner